Patented Feb. 20, 1945

2,370,031

UNITED STATES PATENT OFFICE 2,370,031

PROCESS FOR IMPROVING FIBROUS MATERIAL AND THE MATERIAL TREATED BY SUCH PROCESS

Charles Graenacher, Riehen, Richard Sallmann, Bottmingen, Otto Albrecht, Muenchenstein, and Jost Frei, Basel, Switzerland, assignors to Society of Chemical Industry in Basle, Basel, Switzerland No Drawing. Application January 15, 1940, Serial No. 314,008. In Switzerland May 31, 1938

6 Claims. (Cl. 8—116)

This application is a continuation-in-part of our application Serial No. 276,026, filed May 26, 1939, now Patent No. 2,345,110.

This invention relates to a process for improving fibrous materials by treating the materials with products of the general formula

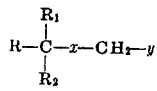

wherein R represents an organic radical containing less than 20 carbon atoms and at least one hydrogen halide ester group, $R_1$ and $R_2$ stand for a member of the group consisting of hydrogen, lower alkyl and halogen substituted lower alkyl, $x$ stands for a member of the group consisting of oxygen, sulfur and a carboxylic acid amide bridge, and $y$ stands for a basic group which determines the solubility of the product in water and is united with the —$CH_2$— group by a hetero-atom, and heating the thus treated materials. In this manner a textile material of basic character or enhanced basic character is produced. R of the above formula may be a hydrocarbon radical, for instance methyl, ethyl, propyl, octyl, decyl, substituted, if desired, by hydroxy groups or the like, or a hydrocarbon chain interrupted by hetero-atoms, such as oxygen or sulfur. Hydrogen halide ester groups include such halogen atoms, for instance chlorine or bromine atoms, which by reaction of alcoholic hydroxyl groups with hydrogen halides may be introduced into organic compounds under suitable conditions. Halogen atoms which are hydrogen halide esters are distinguished from other halogen atoms which are not such esters, for example the halogen atoms in the acid halides, by the property of being converted into basic groups when heated with basic compounds. Particularly suitable are such products in which the hydrogen halide ester group is linked to that carbon atom of the radical R which is bound to the group

This is the case for example with the products of the formulas

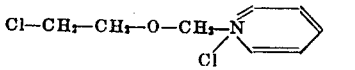

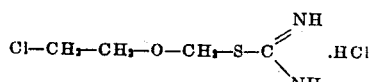

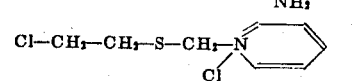

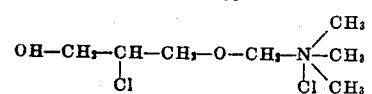

The products of the last four formulas illustrate the formula

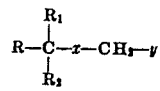

wherein R, $R_1$, $R_2$ and $y$ have the significance given above and $x$ stands for oxygen or sulfur. A product of the formula

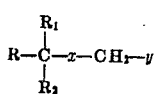

wherein R, $R_1$, $R_2$ and $y$ have the significance given above and $x$ stands for a carboxylic acid amide bridge, is for example the product of the formula

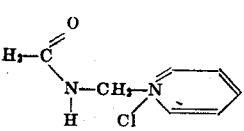

By the expression "hetero-atom" there are to be understood as usual such atoms which are different from carbon atoms and which may be a member of a hetero-cycle, as is the case with oxygen, sulfur or nitrogen.

Basic groups which determine the solubility of the products in water are for example amino or imino groups, for example in the form of thiourea radicals, ammonium groups such as quaternary ammonium groups or ternary sulfonium groups.

Further products which may be used in this invention and correspond with the general formula

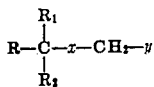

wherein R, $R_1$, $R_2$ and $y$ have the significance given above and $x$ is an oxygen atom or a sulfur atom may be made from the corresponding α-halogenmethylethers of halogenated alcohols or α-halogenmethylthioethers of halogenated mercaptans and tertiary amines such as trimethylamine, triethylamine, dimethylcyclohexylamine, dimethyl aniline, pyridine, C-alkylpyridine, quinoline under mild conditions, for instance at room temperature. The α-halogenmethylether or α-halogenmethylthioether may be made from the alcohol or mercaptan respectively which comprises at least one halogen atom, for example from ethylene-chlorhydrin, 3-chloropropanol-(1), 2:3-dichloropropanol-(1), 2-chloro-2-methylpropanol-(1) by reaction with formaldehyde and halogen hydride.

Further products which may be used in this invention and correspond with the general formula

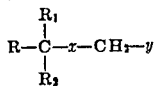

wherein R, $R_1$, $R_2$ and $y$ have the significance given above and $x$ is a carboxylic acid amide bridge, may be obtained in the known manner from halogenated carboxylic acid amides such as chloracetamide, β-chloropropionic acid amide, α-bromobutyric acid amide, α-bromolauric acid amide, α-bromostearic acid amide, 2:9:10-tribromostearic acid amide, chlorosuccinic acid diamide, para-chloromethyl-benzamide, naphthenic acid amides and resin acid amides which contain halogen atoms capable of exchange by means of formaldehyde and a salt of a tertiary amine. Alternatively the N-methylolcarboxylic acid amide obtainable from the carboxylic acid amide in the known manner may be caused to react with a salt or addition product of the tertiary amine preferably in presence of a free tertiary amine to form a quaternary ammonium salt.

As products of the general formula

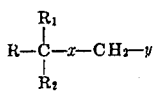

wherein R, $R_1$, $R_2$ and $x$ have the significance given above and $y$ is the residue of a thio-urea there may be used those which are obtainable from α-halogenmethylethers, α-halogenmethylthioethers, N-halogenmethylamides or N-methylolamides of carboxylic acids and thio-ureas, such as thio-urea itself. Methods for the production of such thio-urea derivatives from carboxylic acid amides are described, for instance, in application Serial No. 251,848, filed January 19, 1939, now Patent No. 2,345,109.

The products which are to be used according to the present invention may be caused to act on textile materials preferably by impregnating the material with a solution or dispersion of the product, if desired in presence of a catalyst, for instance a weak acid or acid salt and subsequent treatment at a raised temperature, for instance 115–120° C. As solvent or dispersing agent water is best, especially in the case of products of low molecular weight. However, other organic solvents, for instance pyridine, dimethylaniline or dioxane may be used. Where a dispersion is necessary this can be made by known methods.

Textile materials treated according to the present invention may be treated afterwards with ammonia, a primary, secondary or tertiary amine such as methylamine, monoethanolamine, diethanolamine, trimethylamine, triethylamine, triethanolamine, pyridine or dimethylaniline; reaction may occur in the known manner at an ordinary or raised temperature.

When treating fibrous materials with the products of the general formula

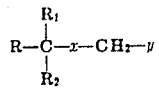

as defined above, for instance products of the formula

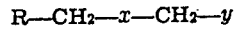

in the heat there are formed basic fibrous materials. In all probability the basic group $y$ enters into reaction on heating with the hydrogen halide ester groups present in the radical R, whereby reaction products of the compounds used which may contain only basic groups in stable union are fixed on the fibrous materials in a form which is fast to washing. Tertiary amines eliminated, for instance from quaternary ammonium groups by the heat-treatment are in all probability subsequently bound by the reactive halogen atoms with formation of new quaternary ammonium groups.

The basic fibrous materials, obtainable according to the present invention, especially from cellulose material or material containing cellulose may be dyed deep fast tints with acid dyestuffs such as acid wool dyestuffs or acid dyestuffs containing metal in complex union, mordant dyestuffs, sulfuric acid ester salts of vat dyestuffs, dyestuff esters or amides such as are described in U. S. Patent 2,095,600 and in patent application Serial No. 173,528, filed November 8, 1937, now Patent No. 2,235,480. Dyestuff intermediate products of acid character are also absorbed by the textile materials containing basic groups. Direct dyestuffs yield for example on basic cellulose derivatives, obtainable by the process of the invention, dyeings which in general are more fast to washing than those obtained on the untreated material; this is probably due to the formation of a salt. The acid dyestuff taken up by the basic cellulose derivative can, if its constitution permits, be diazotized on the fiber and developed in the usual manner with an azo-component. It is also possible to treat a suitable dyestuff on the fiber with a diazonium compound.

Similarly to the acid dyestuffs and their intermediate products other compounds of an acid nature, for instance fatty acids, resin acids, naphthenic acids, sulfuric acid esters of alcohols of high molecular weight or of hydroxy-fatty acids and their esters, also sulfonic acids of high molecular weight which contain besides an aliphatic or cycloaliphatic radical of high molecular weight an external sulfonic acid group, for instance cetyl-sulfonic acid, oleyloxyethane-sulfonic acid, N-oleyl-N-methyl-aminoethane sulfonic acid, N-benzyl-μ-heptadecylbenzimidazoldisulfonic acid, sulfophthalic acid-mono-octadecylester and salts of these acids may be absorbed by the textile material containing the basic groups, in particular the basic cellulose derivatives. By suitable choice of the components there may be obtained in this manner a surprisingly soft feel of the goods.

By the application of the process to textile materials such as wool and silk which already contain basic groups, the basic character of the material may be increased.

In case the process of the invention is applied to colored textile goods, there is the possibility of enhancing the fastness of the dyeings especially the fastness to washing. These dyeings which have been obtained with dyestuffs forming colored anions like dyestuffs containing sulfo-groups whether these dyestuffs are for instance acid wool dyestuffs or direct cotton dyestuffs are improved by treatment with the products of the kind in question. The products to be used in the invention are soluble in water or easily dispersed therein and may be decomposed by heat or by treatment with saponifying agents, whereupon they separate as insoluble bodies. If this decomposition occurs on the substratum, for instance a textile, the insoluble body separates in an adherent form. It may impart, according to its nature, valuable properties to the fiber. Among these may be mentioned the waterproof or water-repellent character fast to washing which in some cases is connected with an especial softness and fullness, which latter may be still further enhanced by addition of a suitable filling agent.

There may be also a considerable diminution of the hygroscopic character and an increase of insulating properties with reference to heat and electricity. As further properties which can be imparted to the fiber there may be named the prevention of the tendency to crease, prevention of the shifting of the threads, diminution of lustre, increase of stability to water, prevention of shrinking of the fabric and in the case of wool the prevention of felting. By local application of the process, calendering effects, matte effects and damask effects may be produced and also color effects which have their origin in the changed affinity of the fiber to dyestuffs. When the process is applied to colored textiles the properties of the dyeings such as fastness to light, to rubbing, to washing and to water are essentially increased. These different effects may be interconnected.

The process is applicable to vegetable and animal fibrous material or to fibrous artificial products, for instance cellulose or materials containing cellulose, cotton, viscose artificial silk, copper artificial silk, paper, wool, silk and mixed fibrous materials, for instance in the form of threads or fabrics. Moreover materials of artificial fibers which contain cellulose or cellulose derivatives or protein substances may be treated.

The products used for the process of the invention may be used alone or together with other materials, for instance salts, especially those of feeble acid, for instance sodium acetate and together with solvents, soapy substances and protective colloids may be used as dressing, weighting and softening or matting agents.

The following examples illustrate the invention, the relationship of parts by weight to parts by volume is that which exists between the kilo and the liter.

*Example 1*

Cotton fabric is impregnated with an aqueous solution of 8–10 per cent strength of the β-chlor-ethoxymethylpyridinium chloride corresponding to the formula

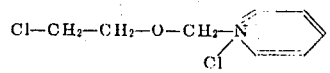

at 30–40° C. with addition of sodium acetate; it is then squeezed, dried and heated for 1–2 hours at 115–125° C. The material thus obtained and lightly rinsed shows a pronounced affinity for acid wool dyestuffs. This property may be somewhat increased if the material after it has been heated is treated with a base, for instance, pyridine, trimethylamine or piperazine.

Instead of the above used product there may also be used the products obtainable in analogous manner from 1:2 - propyleneglycolchlorohydrine, 1:3-propyleneglycolchlorohydrine, butyleneglycolchlorohydrine, hexyleneglycolchlorohydrine, glycerine-β-mono-chlorohydrine.

*Example 2*

Textile goods, for example cotton fabric, are treated in the manner described in Example 1 with a solution of the chloracetaminomethylpyridinium chloride, obtainable from methylolchloracetamide and pyridine hydrochloride corresponding to the formula

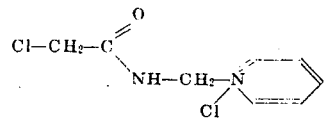

By this treatment the material acquires a pronounced affinity for acid wool dyestuffs.

The chloracetaminomethyl-pyridinium chloride may be obtained as follows:

12.3 parts of methylolchloracetamide are dissolved in 50 parts by volume of alcohol and after an addition of 12 parts of pyridine-hydrochloride the whole is boiled for one hour under reflux. After distilling the alcohol the new quaternary pyridinium chloride remains in the form of an amorphous colorless mass freely soluble in water; after standing for some time the mass becomes a crystalline powder.

Instead of the above quaternary salt there may also be used such products which are derived in analogous manner from the β-chloropropionic acid amide or from the α-bromovaleric acid amide.

*Example 3*

A cotton fabric which has been dyed with 2½ per cent of its weight of Direct Fast Violet 2RL (Schultz, Farbstofftabellen, 7th edition, vol. II, page 88) and is then treated with a solution of 10 per cent strength of β-chlorethoxymethylpyridinium chloride corresponding to the formula

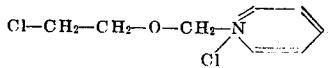

in presence of an equivalent quantity of sodium acetate for 10 minutes at 20–30° C.; it is then squeezed and dried preferably at a low temperature and then heated for 1–2 hours at 115–120° C. The dyeing thus treated has a pronounced fastness to water and to washing.

*Example 4*

Cotton fabric is treated as follows with the condensation product from β-chlorethyl-chlormethylether corresponding probably to the formula

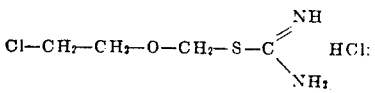

2 parts of the condensation product from chloromethyl-β-chloroethylether and thiourea are dissolved in 4 parts of distilled water. After addition of 14 parts by volume of a sodium acetate solution of 10 per cent strength a piece of bleached cotton fabric is impregnated in this solution, squeezed, dried at 50° C. and then heated for 10 minutes to 120° C. The material is rinsed in hot water, dried and heated in pyridine during 30 minutes to 100° C. After washing out and drying the cotton fabric thus treated has a good affinity for wool dyestuffs.

The condensation product used can be prepared as follows:

A solution of 12.8 parts of chloromethyl-β-chloroethylether in 30 cc. of dry acetone is added in drops, while cooling with ice and stirring, to a suspension of 8.5 parts of finely pulverized thiourea in 40 cc. of dry acetone. When all is introduced stirring is continued for a further hour at ordinary temperature, the solution is then filtered and the residue is liberated from acetone at ordinary temperature in a vacuum. The new product forms a colorless crystalline mass which is easily soluble in water.

Such products may be used in similar manner which have been prepared according to analogous processes from the propylene-chlorohydrines from glycerine-β-chlorohydrine or from hexylene-chlorohydrines.

What we claim is:

1. A process for improving fibrous materials, which comprises treating the materials with a product of the general formula

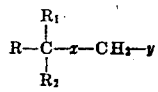

wherein R represents an organic radical containing at least one hydrogen halide ester group, $R_1$ and $R_2$ stand for a member of the group consisting of hydrogen, lower alkyl and halogen substituted lower alkyl, $x$ stands for a member of the group consisting of oxygen, sulfur and a carboxylic acid amide bridge, and $y$ stands for a member of the group consisting of quaternary ammonium groups and isothiourea radicals in salt form united with the —$CH_2$— group by their sulfur atom, drying the materials thus treated, and heating them to at least 100° C.

2. A process for improving fibrous materials, which comprises treating the materials with a product of the general formula

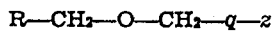

wherein R represents an alkyl radical containing less than 5 carbon atoms and at least one hydrogen halide ester group bound to that carbon atom of the radical R which unites the radical R with the —$CH_2$— group, $q$ stands for a quaternary nitrogen atom, and $z$ stands for a monovalent anion, drying the materials thus treated and heating them to at least 100° C.

3. A process for improving fibrous materials, which comprises treating the materials with a product of the formula

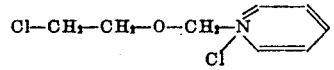

drying the materials thus treated, and heating them to at least 100° C.

4. Fibrous materials treated at temperatures of at least 100° C. after previous drying with a product of the general formula

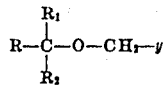

wherein R represents an organic radical containing at least one hydrogen halide ester group, $R_1$ and $R_2$ stand for a member of the group consisting of hydrogen, lower alkyl, and halogen substituted lower alkyl, and $y$ stands for a member of the group consisting of quaternary ammonium groups and isothiourea radicals in salt form united with the —$CH_2$— group by their sulfur atom, which fibrous materials have basic properties.

5. Fibrous materials treated at temperatures of at least 100° C. after previous drying with a product of the general formula

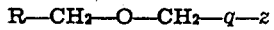

wherein R represents an alkyl radical containing less than 5 carbon atoms and at least one hydrogen halide ester group bound to that carbon atom of the radical R which unites the radical R with the —$CH_2$— group, $q$ stands for a quaternary nitrogen atom, and $z$ stands for a monovalent anion, which fibrous materials have basic properties.

6. Fibrous materials treated at temperatures of at least 100° C. after previous drying with a product of the formula

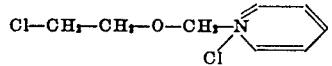

which fibrous materials have basic properties.

CHARLES GRAENACHER.
RICHARD SALLMANN.
OTTO ALBRECHT.
JOST FREI.